US009085351B2

(12) United States Patent
Burd

(10) Patent No.: US 9,085,351 B2
(45) Date of Patent: Jul. 21, 2015

(54) AIRCRAFT MONUMENT WITH IMPROVED THERMAL INSULATION AND ACOUSTIC ABSORPTION

(71) Applicant: B/E Aerospace, Inc., Wellington, FL (US)

(72) Inventor: Peter John Leslie Burd, Carmarthenshire (GB)

(73) Assignee: B/E Aerospace, Inc., Wellington, FL (US)

(*) Notice: Subject to any disclaimer, the term of this patent is extended or adjusted under 35 U.S.C. 154(b) by 161 days.

(21) Appl. No.: 13/961,715

(22) Filed: Aug. 7, 2013

(65) Prior Publication Data
US 2014/0044913 A1    Feb. 13, 2014

Related U.S. Application Data

(60) Provisional application No. 61/681,756, filed on Aug. 10, 2012.

(51) Int. Cl.
B32B 3/18       (2006.01)
B64C 1/40       (2006.01)
B32B 5/18       (2006.01)
B32B 7/02       (2006.01)
B64D 11/04      (2006.01)
B64C 1/06       (2006.01)
B32B 5/24       (2006.01)
B32B 3/26       (2006.01)

(52) U.S. Cl.
CPC . B64C 1/40 (2013.01); B32B 3/266 (2013.01); B32B 5/18 (2013.01); B32B 5/245 (2013.01); B32B 7/02 (2013.01); B64C 1/066 (2013.01); B64D 11/04 (2013.01); B32B 2262/106 (2013.01); B32B 2307/304 (2013.01); B32B 2307/56 (2013.01); Y02T 50/46 (2013.01); Y10T 428/231 (2015.01)

(58) Field of Classification Search
CPC ......... B32B 3/18; B64D 11/04; F16L 59/065; B64C 1/40
USPC ............... 428/48, 69, 138; 244/1 N, 133
See application file for complete search history.

(56) References Cited

U.S. PATENT DOCUMENTS 4,776,903 A      10/1988   Nordskog
2009/0304979 A1  12/2009   Mueller et al.

FOREIGN PATENT DOCUMENTS

EP   2031326 A2      3/2009
WO   2005075188 A1   8/2005
WO   2013142423 A1   9/2013

OTHER PUBLICATIONS

EPO, International Search Report and Written Opinion from International Patent Application No. PCT/US2013/054934 dated Dec. 20, 2013.

Primary Examiner — Alexander Thomas
(74) Attorney, Agent, or Firm — Fulwider Patton LLP

(57) ABSTRACT

A protective shell for an aircraft galley wall is disclosed having an above work deck area and a below work deck area, the protective shell having an outer skin, an intermediate layer comprising vacuum insulated panels, and an interior layer comprising carbon fiber composite having a thickness that is greater than a thickness of the intermediate layer. In a preferred embodiment, the protective shell also includes an acoustic insulating layer made of an open cell acoustic foam that absorbs galley noise.

7 Claims, 2 Drawing Sheets

AIRCRAFT MONUMENT WITH IMPROVED THERMAL INSULATION AND ACOUSTIC ABSORPTION

CROSS-REFERENCES TO RELATED APPLICATIONS

This application claims priority from U.S. Application No. 61/681,756, filed Aug. 10, 2012, incorporated by reference in its entirety.

BACKGROUND

The commercial aircraft manufacturers have requirements for food storage that require equipment for storing food be capable of achieving and maintaining temperatures that will preserve perishable food stuffs for consumption by passengers during flight. A food storage structure such as a galley must have a level of thermal insulation that resists conductive losses to allow the galley to meet or exceed the manufacturer's and airworthiness authority's requirements for the safe storage of food. The minimum thermal resistance level of a food storage structure is usually specified as an average value for the entire monument, which takes into account losses through cold bridges between the chilled compartments and the warmer exterior ambient temperatures. These cold bridges can take the form of metallic items such as floor fittings, edge members, potted inserts, bobbins, embedded and mouse hole blocks, sliding tables, door hinges, latches, and access panels, as well as poorly insulated non metallic areas such as recessed panels, cut outs and cable passes.

The average thermal resistance performance of a chilled storage structure therefore equates to the capability of the non metallic panel, less any losses through cold bridges and poorly insulated areas. By test, it has been established that a 13 mm (roughly ½") Nomex cored pre-preg structural panel is insufficient to maintain galley chilled compartments at or below the required safe temperature for perishable food stuffs. In order to improve the monuments thermal capability, either the thickness of the panel has to be increased or secondary insulation has to be added to the structure.

In addition, the reduction of intrusive noise into an aircraft cabin, usually produced by the routine operation of an in-flight airline catering service, is a prime objective of the aircraft manufacturers. Most of this noise is produced by Galley Insert Equipment (GAINS), e.g. ovens, refrigerators, beverage makers, trash compactors, blenders, etc., and by the cabin crew preparing meals, e.g., removing standard meal boxes from their compartments, filling meal carriers for ovens, slamming compartment doors, removing carts from their compartments, and the like. Because this noise is bothersome to the passengers, the aircraft manufacturers seek to reduce the overall noise in the passenger cabin by providing sound absorbers. This comes at the expense of weight and cost, which are constant factors in an aircraft design and operation.

SUMMARY OF THE INVENTION

The present invention provides a lightweight easily fitted and removed super efficient thermal barrier, enclosing a high percentage of the cold bridges affecting the ability of a given galley chilling to meet its target temperatures. The barrier is reconfigurable and capable of being customized to the requirements of a particular airline. Thermal insulation is applied only where required, saving weight and costs. Non-chilled monuments can use the same principal without insulation. The present invention provides for exceptionally high insulation values with a minimum thickness, resulting in a very small increase to the overall galley foot print. An optional acoustic layer can easily be added for a quieter passenger compartment. The present invention is applicable to all types of narrow or wide bodied commercial aircraft monuments, for both for new and existing airplane types.

DETAILED DESCRIPTION OF THE PREFERRED EMBODIMENTS

Figure 1:
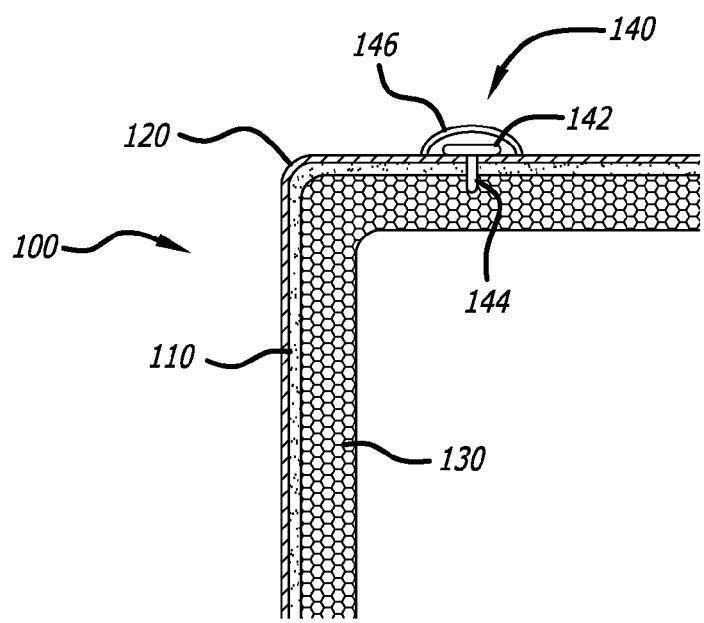
FIG. 1 is a cross-sectional view of a portion of an aircraft galley with tri-layer thermal insulation system.

FIG. 1 illustrates a cross-section of an outer shell 100 enclosing an aircraft monument. The outer shell 100 and the monument (not shown) sandwich a layer of micropore thermal insulation in the form of 3 mm thick (⅛") vacuum insulation panel ("VIP") tiles 110, such as those offered by NanoPore, Inc. VIPs are made by sealing the thermal insulation in a barrier film under vacuum. The barrier film is formed into a pouch which the panel insert is put inside before the unit is evacuated and heat sealed. The sealed edges of the barrier film creates a flap of film which extends out from the edges of the panel which can be folded and taped against the panel in use. In the galley overlay, these VIP tiles 110 may alternatively be attached either to the monument structure directly or to the inner wall of an impact resistant outer skin 120, which has a thickness of roughly one half the thickness of the VIP tiles 110. The tiles 110 are strategically placed in locations where an improvement to the thermal insulation properties of the galley are required, such as coolers, chillers, and the like. For non-chilled areas, the shell 120 is padded with a non-insulating filling panel or spacers to maintain the correct distance from the structural outer surface while saving on cost and weight.

The shell skin 120 is preferably constructed of Carbon Reinforced Composite Pre Preg, fiberglass, Kevlar, or thermoplastic, and is designed to be fitted in sections to the monument. The fitted sections include, for example, the back and both side walls (e.g. center line galley), as this allows the shell 120 to be easily fitted and removed when the aircraft is in service. The skin 120 performs two functions: (1) as a protective layer for the VIP panels; and (2) as a carrier for an airlines choice of décor or trim. The skin 120 is bonded preferably in a conventional manner using a high temperature contact adhesive.

The skin 120 and VIP insulation panels are bonded to a carbon composite panel 130 having a thickness of approximately 10 mm, or roughly twice the thickness of the skin 120 plus the VIP panel 110. The skin 120 and VIP panel 110 are secured to the carbon composite panel 130 by an anchor pin 140 having a head 142, a body 144, and a decorative cover 146.

Figure 2:
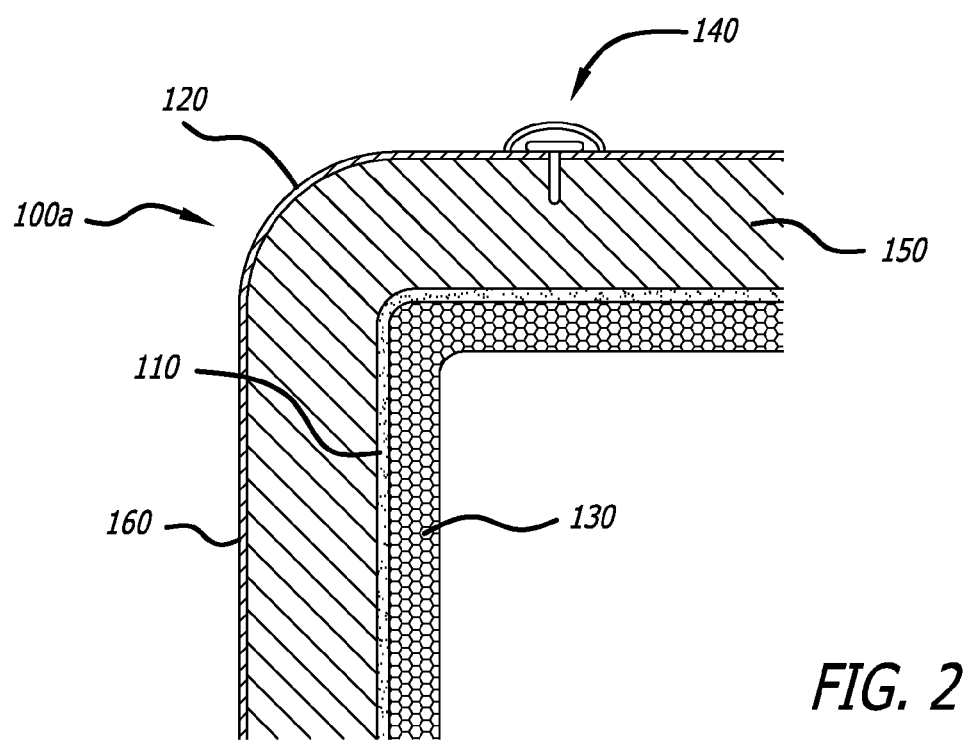
FIG. 2 is a cross-sectional view of the portion of the aircraft galley of FIG. 1 with an additional foam cell layer.

FIG. 2 illustrates a shell 100a similar to that of FIG. 1, with an additional layer consisting of 20-25 mm of open cell acoustic foam 150, together with the 3 mm layer of VIP thermal insulation 110. The foam 150, which is approximately twice the thickness of the carbon composite panel 130, is designed to absorb the acoustic energy generated from the working face of the galley, and may alternatively be attached to either the outer surface of the VIP panels 110, or to the inside surface of the outer skin 120. Thermally, the galley achieves an improved resistance due to the inherent thermal properties of the foam layer 150, thereby enhancing the monument's external impact resistance and impact sound absorbent qualities. The outer skin 110 can be designed with an open weave including perforations in a manner that allows promotion or esthetic décor be implemented into the outer wall.

Figure 3A:
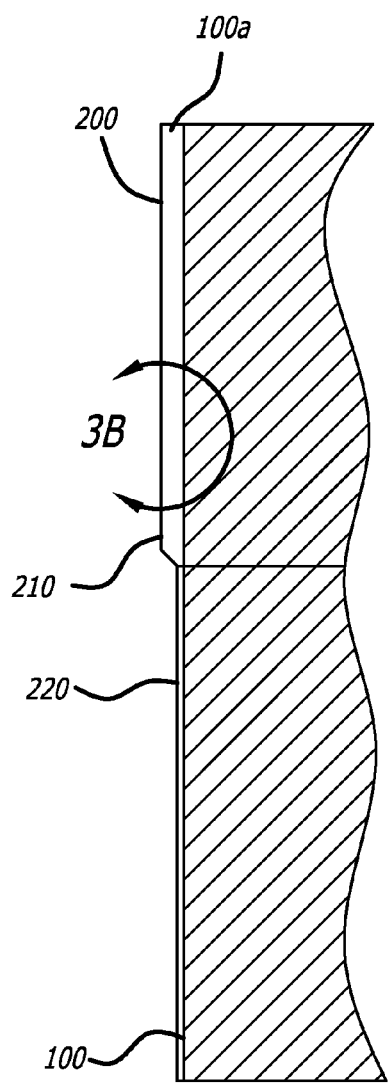
FIG. 3a is a side view of a galley wall illustrating the protective covering.
Figure 3B:
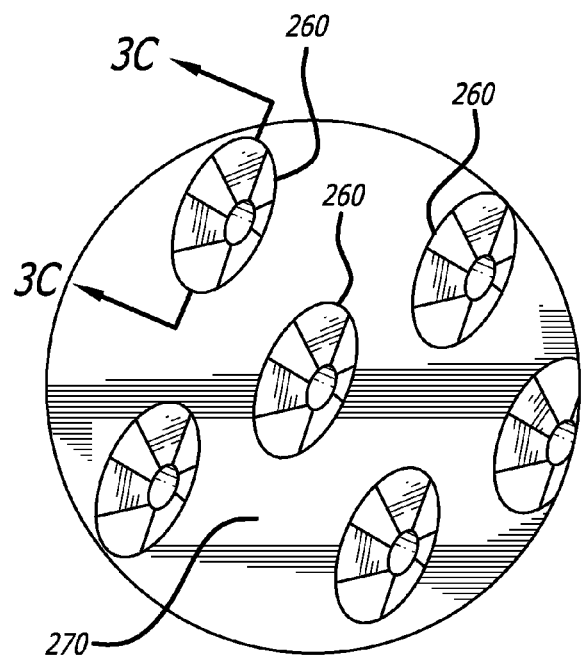
FIG. 3b is an enlarged, perspective view of the protective covering showing the microcone structure.
Figure 3C:
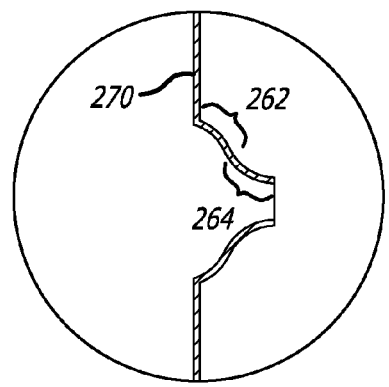
FIG. 3c is a cross sectional view of the microcone structure.

FIG. 3 illustrates a profile of a galley side wall 200 configured with the tri-layer composite of the present invention. FIG. 3a shows an upper half 210 corresponding with the galley work deck (not shown), and a lower half 220 corresponding to below the work deck. The change in thickness of the protective shell 100, 100a corresponds to the inclusion in the shell 100a of the open cell foam 150 for acoustic absorption, which is optionally omitted in the below work deck area. The galley side wall 200 incorporates sound absorption foam in the upper half, where the food processing equipment, voices, and a majority of the other noises are generated, while saving costs on the foam and conserving space in the lower half 220 of the galley panel 200. The surface of the panel 200 includes a plurality of microcones structures 260 on the surface 270 of the galley wall, as shown in FIGS. 3b and 3c. The microcone structures 260 includes a concave portion 262 and a convex portion 264, which combine to absorb and deflect sound waves and create an acoustic attenuation that is greater than a flat wall.

The benefits of the present invention are many faceted. First, the removable outer skin provides damage protection to the otherwise vulnerable thermal layer, and acts as a carrier for external décor trim that airlines can use advantageously for aesthetics or promotion. Furthermore, the thermal barrier encloses most or all potential cold bridges from chilled compartments on all but the working face of the monument (e.g., the center line galley). Lateral refrigerated galleys can also be insulated on the reverse using VIP panels without the need for a protective skin. If the skin or panels become damaged, they can be replaced in service without disturbing the monument's aircraft attachment points making repairs significantly more cost effective and efficient. Also, enhanced insulation is only provided where required, saving weight while minimizing the galley foot print.

Another advantage of the present invention is that a further sound absorbent acoustic layer can be added to reduce the reverberant noise generated from the galley meal service and GAINS reaching the cabin. This acoustic layer additionally serves to improve the insulation properties of the monument. By using an open weave material for the skin and micro perforating the décor laminate, the shell also absorbs exterior noise, reducing the overall sound levels in the passenger cabin.

The foregoing descriptions and accompanying drawings are intended to be illustrative, and not limiting as to the scope of the present invention. One of ordinary skill in the art will readily recognize and appreciate modifications and substitutions of the various components that do not depart from the spirit of the invention, and the scope of the invention is intended to incorporate all such modifications and substitutions. Therefore, the scope of the invention is properly limited only by the words of the appended claims, using those words ordinary and customary meaning in view of this disclosure.

I claim:

1. A protective shell for an aircraft galley wall having an above work deck area and a below work deck area, comprising:
    an outer skin having a thickness and micro-perforations along an outer surface;
    an intermediate layer comprising vacuum insulated panels, where a thickness of said intermediate layer is greater than the thickness of the outer skin; and
    an interior layer comprising carbon fiber composite having a thickness that is greater than a thickness of the intermediate layer.

2. The protective shell for an aircraft galley wall of claim 1, further comprising a layer of open cell acoustic foam between the skin and the interior layer.

3. The protective shell for an aircraft galley wall of claim 2, wherein the layer of open cell acoustic foam is present only above the work deck.

4. The protective shell for an aircraft galley wall of claim 2, wherein a ratio of a thickness of the acoustic open cell foam to the thickness of the carbon fiber composite panel is 2:1.

5. The protective shell for an aircraft galley wall of claim 1, wherein a ratio of outer skin thickness to intermediate layer thickness is 1:2.

6. The protective shell for an aircraft galley wall of claim 1, wherein the micro-perforations are conical.

7. The protective shell for an aircraft galley wall of claim 1, wherein the vacuum insulation panels are located adjacent thermal sinks to reduce energy loss.

* * * * *